(12) United States Patent
Moniz et al.

(10) Patent No.: US 7,458,202 B2
(45) Date of Patent: Dec. 2, 2008

(54) LUBRICATION SYSTEM FOR A COUNTER-ROTATING TURBINE ENGINE AND METHOD OF ASSEMBLING SAME

(75) Inventors: Thomas O. Moniz, Loveland, OH (US); Jorge F. Seda, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 10/976,523

(22) Filed: Oct. 29, 2004

(65) Prior Publication Data

US 2006/0090449 A1  May 4, 2006

(51) Int. Cl.
*F02K 3/02* (2006.01)
(52) U.S. Cl. .................... 60/226.1; 60/39.08; 60/39.162
(58) Field of Classification Search ................ 60/226.1, 60/268, 39.162, 39.08
See application file for complete search history.

(56) References Cited

U.S. PATENT DOCUMENTS

| | | | |
|---|---|---|---|
| 3,531,935 A * | 10/1970 | Poucher | |
| 3,703,081 A * | 11/1972 | Krebs et al. | |
| 3,903,690 A | 9/1975 | Jones | |
| 4,265,334 A * | 5/1981 | Benhase, Jr. ................ 184/6.11 |
| 4,378,197 A * | 3/1983 | Cattaneo et al. ............. 415/175 |
| 5,272,868 A * | 12/1993 | Ciokajlo et al. ............ 60/39.08 |
| 5,806,303 A | 9/1998 | Johnson | |
| 5,809,772 A | 9/1998 | Giffin III, et al. | |
| 5,813,214 A | 9/1998 | Moniz et al. | |
| 5,867,979 A * | 2/1999 | Newton et al. ............. 60/226.1 |
| 5,867,980 A | 2/1999 | Bartos | |
| 6,158,210 A * | 12/2000 | Orlando ..................... 60/226.1 |
| 6,619,030 B1 * | 9/2003 | Seda et al. ................. 60/226.1 |
| 6,684,626 B1 | 2/2004 | Orlando et al. | |
| 6,711,887 B2 | 3/2004 | Orlando et al. | |
| 6,732,502 B2 | 5/2004 | Seda et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 7,269,938 B2 * | 9/2007 | Moniz et al. ............. 60/39.162 |

(Continued)

FOREIGN PATENT DOCUMENTS

EP 0623736 A1 * 11/1994

(Continued)

OTHER PUBLICATIONS

International Search Report; London Patent Office; Place of Search GB; Ref. No. 13DV-126857; Application No. GB0515220.2; Date Nov. 23, 2005; 3 pgs.

*Primary Examiner*—William H Rodriguez
(74) *Attorney, Agent, or Firm*—William Scott Andes; Armstrong Teasdale LLP

(57) ABSTRACT

A method for assembling a gas turbine engine includes providing a first fan assembly configured to rotate in a first rotational direction, rotatably coupling a second fan assembly to the first fan assembly, wherein the second fan assembly is configured to rotate in a second rotational direction that is opposite the first rotational direction, and coupling a lubrication system to the gas turbine engine such that a lubrication fluid is channeled through at least a portion of the second fan assembly.

16 Claims, 3 Drawing Sheets

U.S. PATENT DOCUMENTS

| | | | |
|---|---|---|---|
| 7,296,398 B2 * | 11/2007 | Moniz et al. | 60/268 |
| 2006/0042223 A1 * | 3/2006 | Walker et al. | 60/39.08 |
| 2006/0090450 A1 * | 5/2006 | Moniz et al. | 60/226.1 |
| 2007/0006569 A1 * | 1/2007 | Brault et al. | 60/226.1 |
| 2007/0084186 A1 * | 4/2007 | Orlando et al. | 60/204 |
| 2007/0157596 A1 * | 7/2007 | Moniz | 60/39.162 |

FOREIGN PATENT DOCUMENTS

| | | | |
|---|---|---|---|
| EP | 0623736 A1 | | 11/1994 |
| GB | 1002714 A | * | 8/1965 |
| GB | 1002714 A | | 8/1965 |

* cited by examiner

LUBRICATION SYSTEM FOR A COUNTER-ROTATING TURBINE ENGINE AND METHOD OF ASSEMBLING SAME

The U.S. Government may have certain rights in this invention pursuant to Task Order NAS3-98004.

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increased size of the inlet radius enables the low-pressure turbine to accommodate additional stages. Specifically, at least one known counter-rotating low-pressure turbine includes an outer turbine having a first quantity of low-pressure stages that are rotatably coupled to the forward fan assembly, and an inner turbine having an equal number of stages that is rotatably coupled to the aft fan assembly.

During operation, lubrication is supplied to the forward and aft fan assemblies utilizing a relatively complex lubrication system. Such lubrication systems are designed to supply lubricating fluid to a plurality of bearings supporting the forward and aft fan assemblies for example. However, to lubricate the forward and aft fan assemblies, at least one known gas turbine engine is configured to channel the lubricating fluid around the plurality of rotating components that are rotating in opposite rotational directions. Accordingly, designing and implementing a lubrication system capable of lubricating the forward and aft fan assemblies within a counter-rotating gas turbine engine may result in increasing the overall weight of the gas turbine engine which may cause an associated increase in the costs of manufacturing and assembling the gas turbine engine.

BRIEF DESCRIPTION OF THE INVENTION

In one aspect, a method for assembling a gas turbine engine is provided. The method includes providing a first fan assembly configured to rotate in a first rotational direction, rotatably coupling a second fan assembly to the first fan assembly, wherein the second fan assembly is configured to rotate in a second rotational direction that is opposite the first rotational direction, and coupling a lubrication system to the gas turbine engine such that a lubrication fluid is channeled through at least a portion of the second fan assembly.

In another aspect, a gas turbine engine is provided. The gas turbine engine includes a first fan assembly configured to rotate in a first rotational direction, a second fan assembly configured to rotate in a second rotational direction that is opposite the first rotational direction, and a lubrication system configured to channel a lubricating fluid through at least a portion of the second fan assembly.

DETAILED DESCRIPTION OF THE INVENTION

Figure 1:
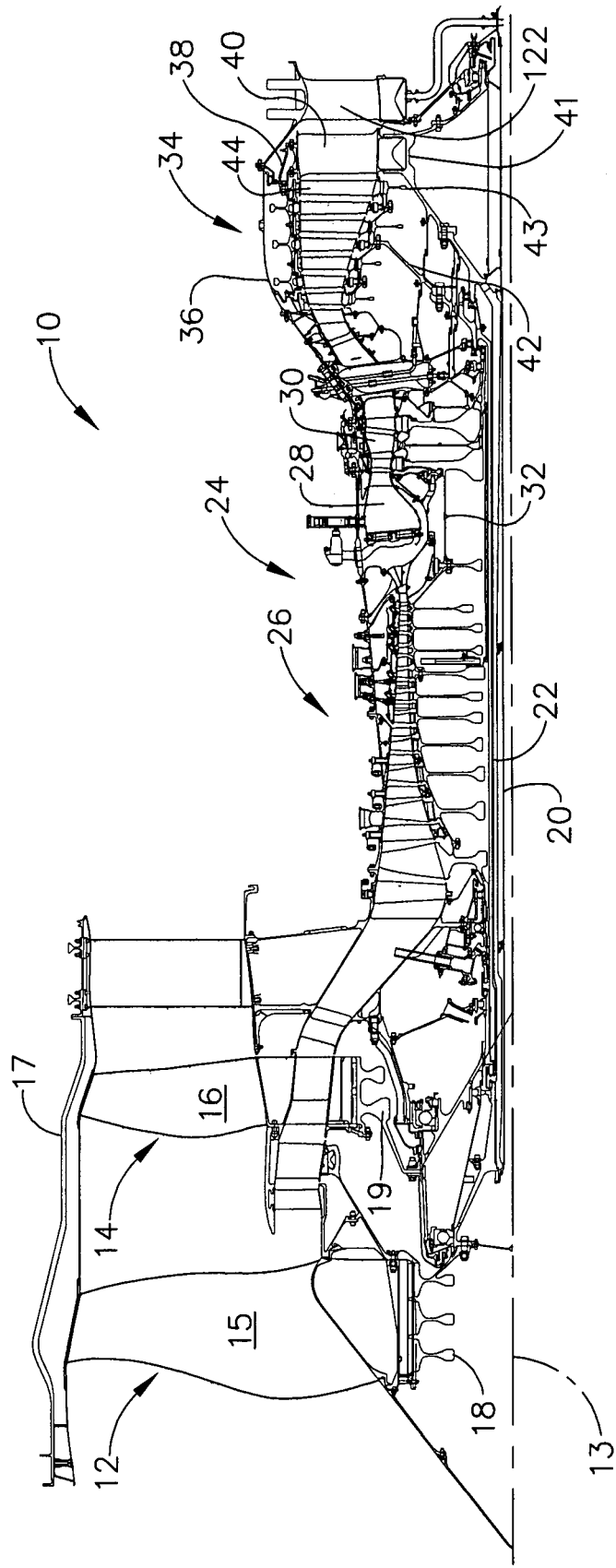
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 13. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 15 and 16, respectively that are positioned within a stationary outer case 17. Blades 15 and 16 are coupled to respective rotor disks 18 and 19 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Low-pressure turbine 34 includes a stationary outer casing 36 that is coupled to core engine 24 downstream from high-pressure turbine 30 (shown in FIG. 1). Low-pressure turbine 34 includes a radially outer rotor 38 that is positioned radially inwardly of outer casing 36. Outer rotor 38 has a generally frusto-conical shape and includes a plurality of circumferentially-spaced rotor blades 40 that extend radially inwardly. Blades 40 are arranged in axially-spaced blade rows or stages 41. Although, the exemplary embodiment only illustrates four stages 41, it should be realized that outer rotor 38 may have any quantity of stages 41 without affecting the scope of the method and apparatus described herein.

Low-pressure turbine 34 also includes a radially inner rotor 42 that is aligned substantially coaxially with respect to, and radially inward of, outer rotor 38. Inner rotor 42 includes a plurality of circumferentially-spaced rotor blades 44 that extend radially outwardly and are arranged in axially-spaced rows 43. Although, the exemplary embodiment only illustrates four stages, it should be realized that inner rotor 42 may have any quantity of rows 43 of blades 44 without affecting the scope of the method and apparatus described herein.

In the exemplary embodiment, inner rotor blades 44 extending from stages 43 are axially-interdigitated with outer rotor blades 40 extending from stages 41 such that inner rotor stages 43 extend between respective outer rotor stages 41.

The blades 40 and 44 are therefore configured for counter-rotation of the rotors 38 and 42.

Figure 2:
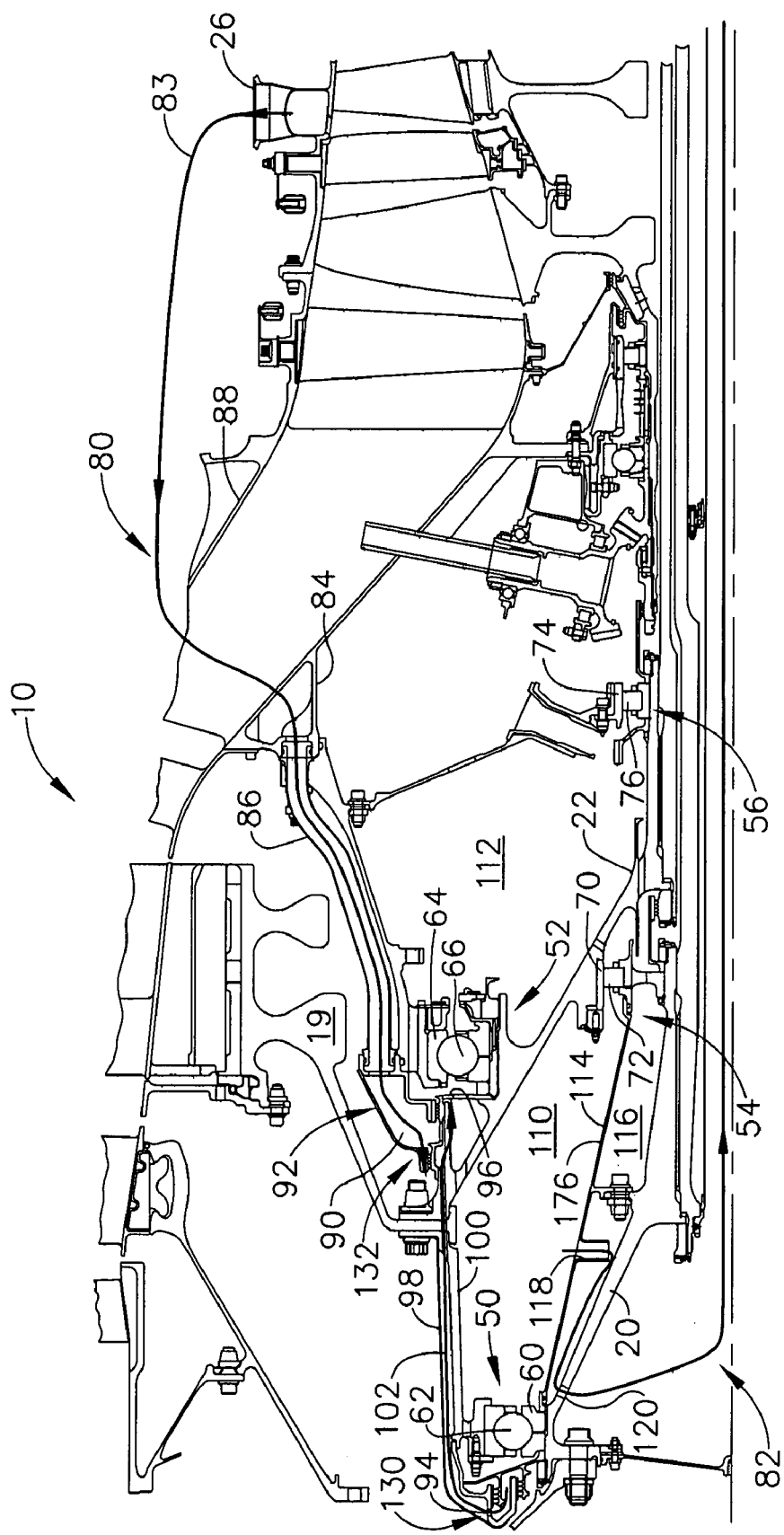
FIG. 2 is a cross-sectional view of a sump pressurization system that can be used with the gas turbine engine shown in FIG. 1.

FIG. 2 is a cross-sectional view of a portion of gas turbine engine 10. In the exemplary embodiment, gas turbine engine 10 also includes a first fan bearing assembly 50 and a second fan bearing assembly 52. First fan bearing assembly 50 includes a bearing race 60 and a rolling element 62 coupled to bearing race 60. Second fan bearing assembly 52 includes a bearing race 64 and a rolling element 66 coupled to bearing race 64. In the exemplary embodiment, fan bearing assemblies 50 and 52 are thrust bearings that are configured to maintain a relatively fixed axial position of forward fan 12 and aft fan 14, respectively. Gas turbine engine 10 also includes a third fan bearing assembly 54 and a fourth fan bearing assembly 56. Third fan bearing assembly 54 includes a bearing race 70 and a rolling element 72 that is coupled to bearing race 70. Fourth fan bearing assembly 56 includes a bearing race 74 and a rolling element 76 that is coupled to bearing race 74. In the exemplary embodiment, fan bearing assemblies 54 and 56 are roller bearings that are configured to maintain a relatively fixed radial position of forward and aft fan assemblies 12 and aft fan 14, respectively.

Gas turbine engine 10 also includes a sump pressurization system 80 and a sump vent system 82. Sump pressurization system 80 includes a first manifold 83 that extends between compressor 26 and a fan frame strut support 84, and a second manifold 86 that extends between fan frame strut support 84 and bearing race 64. More specifically, manifold 83 is coupled to compressor 26 and fan frame strut support 84 such that compressed air discharged from compressor 26 is channeled through a fan frame strut 88 and into manifold 86. The compressed air is then channeled through second manifold 86 and into a cavity 90 defined between bearing race 64 and a second fan assembly seal manifold 92. The compressed air is then channeled through an opening 94 formed within bearing race 60 and an opening 96 formed in bearing race 64 to facilitate pressurizing bearing assemblies 50 and 52, respectively. More specifically, gas turbine engine 10 includes a structural member 98 that is coupled between rotor disk 19 and bearing race 60. In the exemplary embodiment, structural member 98 extends substantially circumferentially around an interior portion of gas turbine engine 10.

During operation, compressed air discharged from compressor 26 is channeled through fan frame strut 88 into manifold 86. The compressed air is then channeled through second manifold 86 into cavity 90. A portion of the compressed air is then channeled through a channel 102 defined between structural member 98 and structural member 100, and through opening 94 to facilitate pressurizing bearing assembly 50. The remaining compressed air is channeled through opening 96 to facilitate pressurizing bearing assembly 52. In the exemplary embodiment, compressed air also pressurizes a pair 130 of labyrinth seals that are positioned proximate to bearing assembly 50 and a pair of labyrinth seals 132 that are positioned proximate bearing assembly 52.

In the exemplary embodiment, sump vent system 82 includes a first sump vent cavity 110 that facilitates venting first fan bearing assembly 50, and a second sump vent cavity 112 that facilitates venting second fan bearing assembly 52. More specifically, gas turbine engine 10 includes a rotating cone 114 that is coupled between bearing assembly 50 and bearing assembly 54 such that a cavity 116 is defined between cone 114 and first fan shaft 20. In the exemplary embodiment, cone 114 includes at least one opening 118 defined therethrough such that first sump vent cavity 110 is coupled in flow communication with cavity 116.

During operation, air vented from each respective bearing assembly 50 and 52 is channeled into cavities 110 and 112, respectively. The discharged air is then channeled from cavities 110 and 112 through opening 118 and into cavity 116. The spent air is then channeled from cavity 116 through at least one opening 120 defined within shaft 20 prior to being discharged through the turbine rear frame 122 (shown in FIG. 1).

Figure 3:
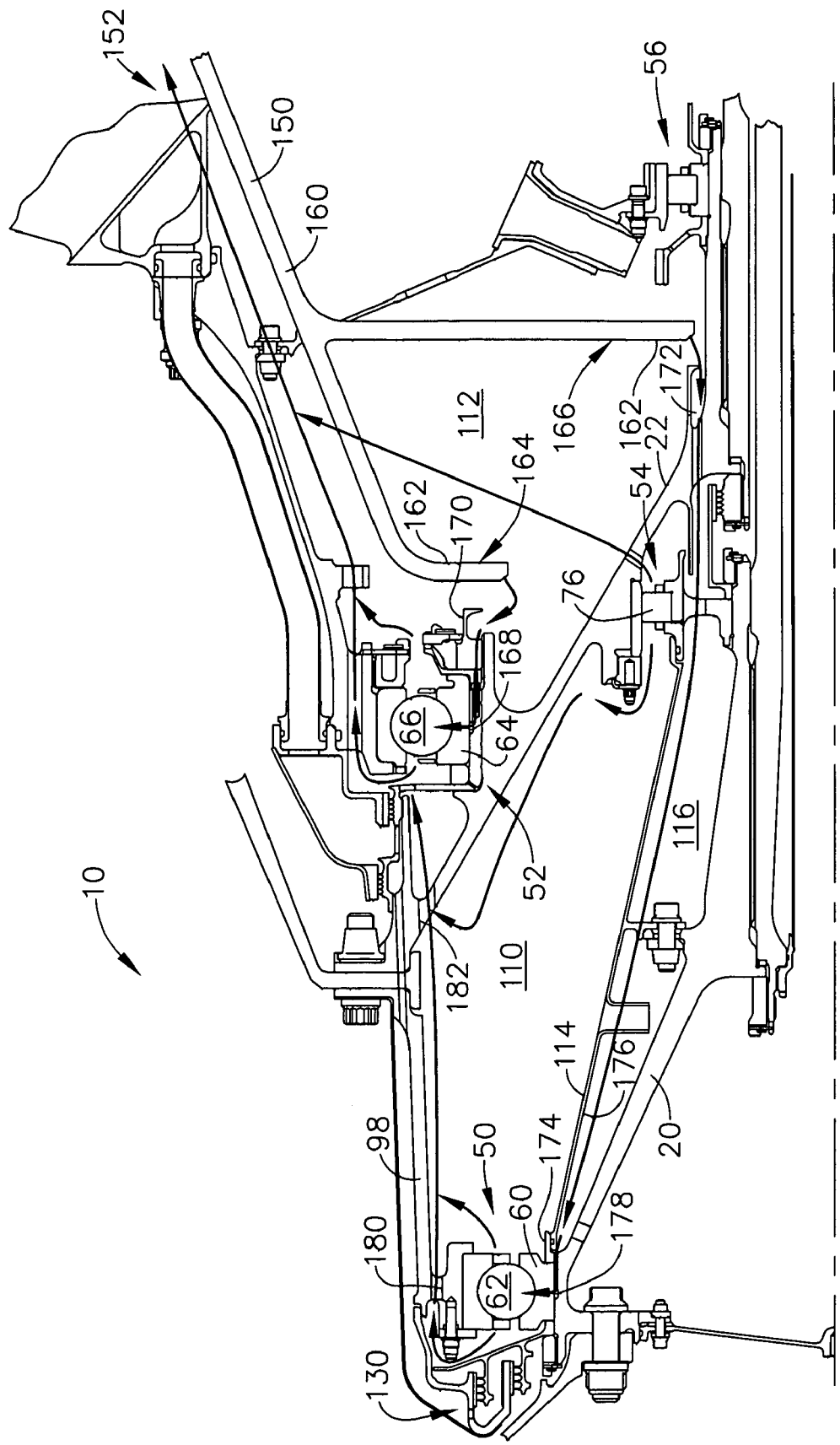
FIG. 3 is a cross-sectional view of a lubrication system that can be used with the gas turbine engine shown in FIG. 1.

FIG. 3 is a cross-sectional view of a portion of gas turbine engine 10. In the exemplary embodiment, gas turbine engine 10 includes a bearing lubrication system 150 and a bearing lubrication drain system 152. Bearing lubrication system 150 includes a supply manifold 160 that is coupled to a lubrication pump (not shown). Supply manifold 160 is coupled to a plurality of jets 162 that supply lubrication oil to bearing assemblies 50, 52, 54, and 56. In the exemplary embodiment, gas turbine engine 10 also includes a first jet 164 and a second jet 166.

During operation, lubrication oil is channeled from the lubrication pump through manifold 160 to jets 164 and 166 where the oil is injected outward from each jet 164 and 166. More specifically, in the exemplary embodiment, lubrication oil discharged from jet 164 is directed towards bearing assembly 52 to facilitate lubricating bearing assembly 52, and lubrication oil discharged from jet 162 is directed towards an approximately L-shaped structural member 170 coupled to bearing assembly 52.

As gas turbine engine 10 rotates, lubrication oil is forced radially outward due to centrifugal force. The oil collects or pools within L-shaped structural member 170 wherein the pooled oil is channeled through an opening 168 within bearing race 64 to facilitate lubricating bearing assembly 52. Approximately simultaneously, lubrication oil is channeled from jet 166 through an opening 172 in shaft 22 into cavity 116. Some of the lubrication oil facilitates lubricating bearing assembly 54, while the remaining oil is channeled along an interior surface of rotating cone 114. As cone 114 rotates, the lubrication oil is forced radially outward against an interior portion 176 of rotating cone 114. Because cone 114 is tapered from bearing assembly 54 to bearing assembly 50, the lubricating oil is channeled axially forward from bearing assembly 54 towards bearing assembly 50 wherein the oil collects or pools within a structural member 174 coupled to shaft 20. The pooled oil is then channeled through an opening 178 within inner race 60 to facilitate lubricating bearing rolling element 62.

After bearing assembly 50 is lubricated, spent oil is channeled through an opening 180 defined within structural member 98 and into cavity 110. Because gas turbine engine 10 is rotating, centrifugal force causes lubrication oil to be forced radially outward toward an inner surface of structural member 98 wherein the lubrication oil is channeled aftward along member 98 through an opening 182 extending through shaft 22. The oil is then channeled around bearing assembly 52 and out through engine casing 36.

After bearing assembly 54 is lubricated, some of the lubrication oil is channeled along an interior portion of cavity 110 wherein the rotation of engine 10 causes the oil to be forced radially outward toward an inner surface of shaft 22. The lubrication oil is then channeled through opening 182 and around bearing assembly 52 prior to being channeled out through engine casing 36. Remaining oil is channeled into cavity 112 where centrifugal force causes the lubrication oil to be channeled radially outward through casing 36. After bearing assembly 52 is lubricated, the lubrication oil is channeled out both sides of bearing rolling element 66 and through casing 36.

The gas turbine engines described herein include a counter-rotating low-pressure turbine, a first fan assembly and a second fan assembly that rotates in a rotational direction that is opposite the first fan assembly. The gas turbine engine also includes a lubrication system and a sump pressurization system. The lubrication system is configured to channel oil through a portion of the rotating fan assembly to facilitate supplying lubrication oil to various bearing assemblies used to support the first and second fan assemblies. The gas turbine engine also includes a sump pressurization system configured to pressurize various bearing sumps by channeling compressed air from the compressor through at least one stage of the counter-rotating fan assembly. Accordingly, the lubrication and pressurization systems described herein facilitate providing channeling lubrication oil and compressed air across a vane-less counter-rotating fan assembly thereby reducing a quantity of tubing required to both lubricate and pressurize the fan bearing assemblies.

Exemplary embodiments of gas turbine systems are described above in detail. The gas turbine systems are not limited to the specific embodiments described herein, but rather, components of the systems may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a first fan assembly configured to rotate in a first rotational direction;
   rotatably coupling a second fan assembly to the first fan assembly, wherein the second fan assembly is configured to rotate in a second rotational direction that is opposite the first rotational direction;
   coupling a lubrication system to the gas turbine engine such that a lubrication fluid is channeled through a least a portion of the second fan assembly;
   coupling a first bearing assembly to the first fan assembly;
   coupling a second bearing assembly to the second fan assembly such that the lubrication fluid is channeled to the first and second bearing assemblies; and
   channeling air through at least a portion of the second fan assembly to facilitate pressurizing the first and second bearing assemblies.

2. A method in accordance with claim 1 further comprising:
   coupling a first shaft to the first fan assembly and to a first turbine rotor that is configured to rotate in a first rotational direction;
   coupling a second shaft to the second fan assembly and to a second turbine rotor that is configured to rotate in a second rotational direction that is opposite the first rotational direction; and
   coupling a cone to the second shaft wherein the cone is configured to rotate with the second shaft.

3. A method in accordance with claim 1 further comprising:
   providing a lubrication manifold;
   coupling a plurality of jets to the lubrication manifold; and
   coupling a pump to the manifold such that oil is injected through the plurality of jets to facilitate lubricating the first and second bearing assemblies.

4. A method in accordance with claim 1 wherein the second shaft includes a pair of openings extending therethrough, said method further comprising channeling lubrication oil from the first bearing assembly through a first opening formed in the seal shaft and channeling lubrication oil from the second bearing assembly through a second opening formed in the seal shaft to an oil reservoir.

5. A method in accordance with claim 1 further comprising:
   coupling a cone to the first shaft such that a cavity is defined between the first shaft and the cone; and
   channeling lubrication oil through the cavity to the first bearing assembly.

6. A method in accordance with claim 1 further comprising:
   coupling a supply manifold to the gas turbine engine compressor outlet such that the supply manifold extends through at least one fan frame strut;
   coupling a second manifold to the supply manifold such that compressed air is channeled from the gas turbine engine compressor to the first and second bearing assemblies.

7. A method in accordance with claim 1 further comprising channeling air through at least a portion of the second fan assembly to facilitate venting the first and second bearing assemblies.

8. A method in accordance with claim 7 further comprising channeling air through a cone first opening, through a first shaft first opening, and into the first shaft.

9. A gas turbine engine comprising:
   a first fan assembly configured to rotate in a first rotational direction;
   a second fan assembly configured to rotate in a second rotational direction that is opposite the first rotational direction;
   a lubrication system configured to channel a lubricating fluid through at least a portion of said second fan assembly;
   a first bearing assembly rotatably coupled to said first fan assembly;
   a second bearing assembly rotatably coupled to said second fan assembly; said lubrication system configured to channel the lubrication fluid to said first and second bearing assemblies; and
   a sump pressurization system configured to channel air through at least a portion of the second fan assembly to facilitate pressurizing said first and second bearing assemblies.

10. A gas turbine engine in accordance with claim 9 further comprising:
    a first shaft coupled said first fan assembly and to a first turbine rotor configured to rotate in a first rotational direction;
    a second shaft coupled to said second fan assembly and to a second turbine rotor configured to rotate in a second rotational direction that is opposite the first rotational direction; and
    a cone coupled to said second shaft and configured to rotate with said second shaft.

11. A gas turbine engine in accordance with claim 9 further comprising:
    a lubrication manifold;
    a plurality of jets coupled to said manifold; and
    a pump coupled to said manifold and configured to channel oil through said plurality of jets to facilitate lubricating said first and second bearing assemblies.

12. A gas turbine engine in accordance with claim 9 wherein said second shaft comprises a first opening extending therethrough and a second opening extending therethrough such that oil is channeled from the first bearing assembly through said first opening and such that oil is channeled from said second bearing assembly through said second opening to an oil reservoir.

13. A gas turbine engine in accordance with claim 9 further comprising a cavity defined between said cone and said first shaft such that said pump channels oil through said cavity to said first bearing assembly.

14. A gas turbine engine in accordance with claim 9 wherein said sump pressurization system comprises:
 a supply manifold coupled to a gas turbine engine compressor outlet and extending through at least one fan frame strut;
 a second manifold coupled to said supply manifold and configured to channel air to said first and second bearing assemblies.

15. A gas turbine engine in accordance with claim 9 further comprising a sump vent system configured to channel air through at least a portion of the second fan assembly to facilitate venting said first and second bearing assemblies.

16. A gas turbine engine in accordance with claim 15 wherein said cone comprises a first opening extending therethrough, and said first shaft comprises at least one opening extending therethrough such that air is channeled through said cone first opening, through said first shaft at least one opening, and into said first shaft.

* * * * *

UNITED STATES PATENT AND TRADEMARK OFFICE
CERTIFICATE OF CORRECTION

PATENT NO. : 7,458,202 B2  
APPLICATION NO. : 10/976523  
DATED : December 2, 2008  
INVENTOR(S) : Moniz et al.

Page 1 of 1

It is certified that error appears in the above-identified patent and that said Letters Patent is hereby corrected as shown below:

Column 5, line 40, delete "through a least" and insert therefor --through at least--.
Column 5, line 58, delete "shaft wherein" and insert therefor --shaft, wherein--.

Signed and Sealed this

Ninth Day of February, 2010

David J. Kappos
*Director of the United States Patent and Trademark Office*